United States Patent
Ahuja et al.

(10) Patent No.: US 9,471,601 B2
(45) Date of Patent: Oct. 18, 2016

(54) IMAGES FOR A QUESTION ANSWERING SYSTEM

(71) Applicant: International Business Machines Corporation, Armonk, NY (US)

(72) Inventors: Salil Ahuja, Austin, TX (US); Scott H. Isensee, Austin, TX (US); Scott M. Lewis, Toronto (CA); William G. O'Keeffe, Tewksbury, MA (US); Cale R. Vardy, East York (CA)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 14/224,486

(22) Filed: Mar. 25, 2014

(65) Prior Publication Data

US 2015/0278252 A1    Oct. 1, 2015

(51) Int. Cl.
*G06F 17/30*    (2006.01)

(52) U.S. Cl.
CPC ... *G06F 17/30268* (2013.01); *G06F 17/30277* (2013.01); *G06F 17/30412* (2013.01); *G06F 17/30643* (2013.01); *G06F 17/30867* (2013.01)

(58) Field of Classification Search
CPC ............. G06F 17/30274; G06F 17/30268; G06F 17/30277; G06F 17/30412; G06F 17/3053; G06F 17/30643; G06F 17/30864; G06F 17/30867
See application file for complete search history.

(56) References Cited

U.S. PATENT DOCUMENTS

| | | | |
|---|---|---|---|
| 7,788,258 B1 | 8/2010 | Malpani et al. | |
| 8,601,030 B2 | 12/2013 | Bagchi et al. | |
| 2001/0044906 A1 | 11/2001 | Kanevsky et al. | |
| 2005/0108692 A1* | 5/2005 | Lau | G06F 8/76 717/136 |
| 2009/0012863 A1* | 1/2009 | Saephan | G06Q 30/02 705/14.54 |
| 2009/0327850 A1 | 12/2009 | Obrecht et al. | |
| 2012/0329032 A1 | 12/2012 | Fan et al. | |
| 2013/0106913 A1* | 5/2013 | Edmiston | G06F 3/14 345/660 |
| 2013/0262501 A1 | 10/2013 | Kuchmann-Beauger et al. | |
| 2013/0288219 A1 | 10/2013 | Dheap et al. | |

FOREIGN PATENT DOCUMENTS

WO    2013125286 A1    8/2013

OTHER PUBLICATIONS

Xin-Jing Wang et al., "Annotating Images by Mining Image Search Results", IEEE, May 2008, pp. 1-14.*

(Continued)

*Primary Examiner* — Etienne Leroux
*Assistant Examiner* — Jared Bibbee
(74) *Attorney, Agent, or Firm* — Jay Wahlquist; William Stock (57) ABSTRACT

A method for providing content relevant images for an input question to a deep question answering system is disclosed. The method can include formulating, in response to receiving the input question, an answer to the input question. The method can also include identifying, based on the answer to the input question, a set of candidate images from a corpus of information. The set of candidate images may relate to the answer. The method can also include determining, based on a confidence value of the set of candidate images and a designated display specification, a first subset of the set of candidate images to provide in a display area. The method can also include selecting the first subset to be provided in the display area.

12 Claims, 7 Drawing Sheets

(56) References Cited

OTHER PUBLICATIONS

Smith et al., "Visually searching the web for content", IEEE, 1997, pp. 12-20.*

Ahuja, S., et al., "Images for a Question Answering System", U.S. Appl. No. 14/476,902, filed Sep. 4, 2014.

Unknown, "iPhone User Guide for iOS 6.1 Software", Apple, Inc. 156 pages. © 2013 Apple Inc.

Unknown, "How to Create a Shared Photo Stream Album on iOS 6 iPhone", Radioshack Mobile Product Support Forum, Sep. 23, 2012. http://forum.radioshack.wdsserve.com/t5/Sprint-Discussion/How-to-create-a-shared-photo-stream-album-on-iOS-6-iphone/m-p/40898.

* cited by examiner

IMAGES FOR A QUESTION ANSWERING SYSTEM

BACKGROUND

This disclosure relates generally to computer systems and more particularly relates to providing content-relevant images for an answer in a question answering system.

The amount of data and information available on the internet and other communication networks is growing rapidly. Question answering systems are one tool by which a user may find desired information. As the amount of available information increases, the need for question answering systems may also increase.

SUMMARY

Aspects of the present disclosure, in certain embodiments, are directed toward a method in a deep question answering system for providing content relevant images for an input question. In certain embodiments, the method can include formulating, in response to receiving the input question, an answer to the input question. The method can also include identifying a set of candidate images from a corpus of information. The set of candidate images may relate to the answer to the input question. Further, in certain embodiments, the method can include determining a first subset of the set of images to provide in a display area. In certain embodiments, determining the first subset of the set of images can be based on a confidence value of the set of candidate images. In certain embodiments, the method can include selecting the first subset to be provided in the display area.

Aspects of the present disclosure, in certain embodiments, are directed toward a computer program product comprising a computer readable storage medium having a computer readable program stored therein. When the computer readable program is executed on a first computing device, it can cause the first computing device to formulate, in response to receiving an input question, an answer to the input question. In certain embodiments, the computer readable program can cause the first computing device to identify a set of candidate images from a corpus of information based on the answer to the input question. In certain embodiments, the set of images can be related to the answer to the input question. In certain embodiments, the computer readable program can cause the first computing device to determine a first subset of the set of images to provide in a display area. Determining the first subset of the set of images can be based on a confidence value of the set of images. In certain embodiments, the computer readable program can cause the first computing device to select the first subset to be provided in the display area.

Aspects of the present disclosure, in certain embodiments, are directed toward an apparatus comprising a processor and a memory coupled to the processor. The memory can comprise instructions, which, when executed by the processor, cause the processor to formulate, in response to receiving an input question, an answer to the input question. In certain embodiments, the instructions can cause the processor to identify a set of candidate images from a corpus of information based on the answer to the input question. The set of candidate images can relate to the answer to the input question. In certain embodiments, the instructions can cause the processor to determine a first subset of the set of candidate images to provide in a display area. Determining the first subset of the set of candidate images can, in certain embodiments, be based on a confidence value of the set of candidate images and a designated display specification. In certain embodiments, the instructions can cause the processor to select the first subset to be provided in the display area.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and methodology for a computer-implemented question answering system. More particular aspects relate to providing content-relevant images for an answer in the question answering system. The methodology may include formulating an answer to an input question received by the question answering system. The methodology may include identifying a set of candidate images. The set of candidate images may be identified based on the answer to the input question, and may relate to the answer. The methodology may include determining a first subset of the set of candidate images to display in a display area. Determining the images to display may be based on a confidence value of the set of candidate images and a designated display specification. Further, the method can include selecting the first subset to be provided in the display area.

As the amount of information available over computer networks, such as the Internet, rapidly increases, question answering systems have become an important tool in assisting users with the gathering, searching, and analysis of data. However, aspects of the present disclosure relate to the recognition that, in certain situations, the results provided to a user in response to an input question may not contain all of the information that a user is looking for. Additionally, searches for textual information and searches for images are often separate, requiring a user to perform multiple separate searches to find both information and images relevant to the original search query. Accordingly, aspects of the present disclosure relate to a system and method for providing images relevant to the content of the input question along with a textual answer to the input question. The images may be selected based on a variety of factors, including relevance to the original input question as well as the size of the image in relation to the size of the display. The present disclosure may provide benefits associated with increased search efficiency, saving a user the time of performing multiple searches, and image visibility.

Aspects of the present disclosure relate to a system and method for providing images related to a question answer in a question answering system. For example, for a search question of "How do I move pictures from my camera to my PC," in addition to a textual answer, images could be provided from a camera instruction manual, or a technical support forum. Further, the images selected to display along with the textual answer may be chosen based on the size of the images in relation to the screen size of the device. For example, larger images could be selected to be displayed if the user is viewing the textual answer and images on a computer monitor, and smaller images could be selected if the user is viewing the textual answer and images on a mobile device, such as a smart phone.

Aspects of the present disclosure include a method and system for managing a computer implemented question answering system. More particular aspects relate to providing content-relevant images for an answer in the question answering system. The method and system may work on a number of devices and operating systems. The method and system can include formulating an answer to an input question received by the question answering system.

Aspects of the present disclosure can include identifying a set of candidate images. Identifying the candidate images can be based on the answer to the input question, and the set of candidate images can relate to the answer. The set of candidate images may be located within a corpus of information. The corpus of information can contain documents and images accessible for search. The answer to the input question can be formulated based on information from a first document, and the set of candidate images can be identified from a second document. Accordingly, identifying the set of candidate images can include performing a search of the corpus of information containing the first document and the second document.

Aspects of the present disclosure can include determining a first subset of the set of candidate images to provide in a display area. Determining the first subset of the set of candidate images can be based on a confidence value of the set of candidate images and a designated display specification. The confidence value of the set of candidate images may be based on similarity of content between the answer to the input question and the set of candidate images. Aspects of the present disclosure can include comparing, using a natural language processing technique, textual information coupled to the set of candidate images with the answer to the input question. Based on comparing, the method can include assigning a confidence measure value to the set of candidate images. Further, the method can include selecting, in response to a first subset having a confidence measure value greater than a threshold value, the first subset to provide in the image display area. Additionally, the method can include providing a control interface configured to display an additional subset of the set of candidate images. The method can also include appending a reference indicating the first subset to a text description associated with the answer to the input question.

The designated display specification of the candidate images and the display area may include a first dimension of the set of candidate images and a second dimension of the display area. Aspects of the present disclosure can include computing the first dimension of the set of candidate images and the second dimension of the display area. The method can include comparing the first dimension of the set of candidate images with the second dimension of the display area. Based on comparing, the method can include assigning a proportional value to a subset of the candidate images.

Aspects of the present disclosure can include selecting, in response to a third subset having a confidence measure value greater than a first threshold value, the third subset to display in the image display area. The method may further include selecting a third subset and a fourth subset to display in the image display area in response to the third subset having a proportional value greater than or equal to a first proportional threshold value. The method can also include selecting, in response to the third subset having a proportional value greater than or equal to a third proportional threshold value, a fifth subset of the candidate of the candidate images having a proportional value lower than the third subset. The method can further include scaling the first dimension of the third subset in response to the third subset having a confidence measure value higher than a second confidence measure threshold value and a proportional value greater than a second proportional threshold value.

Figure 1:
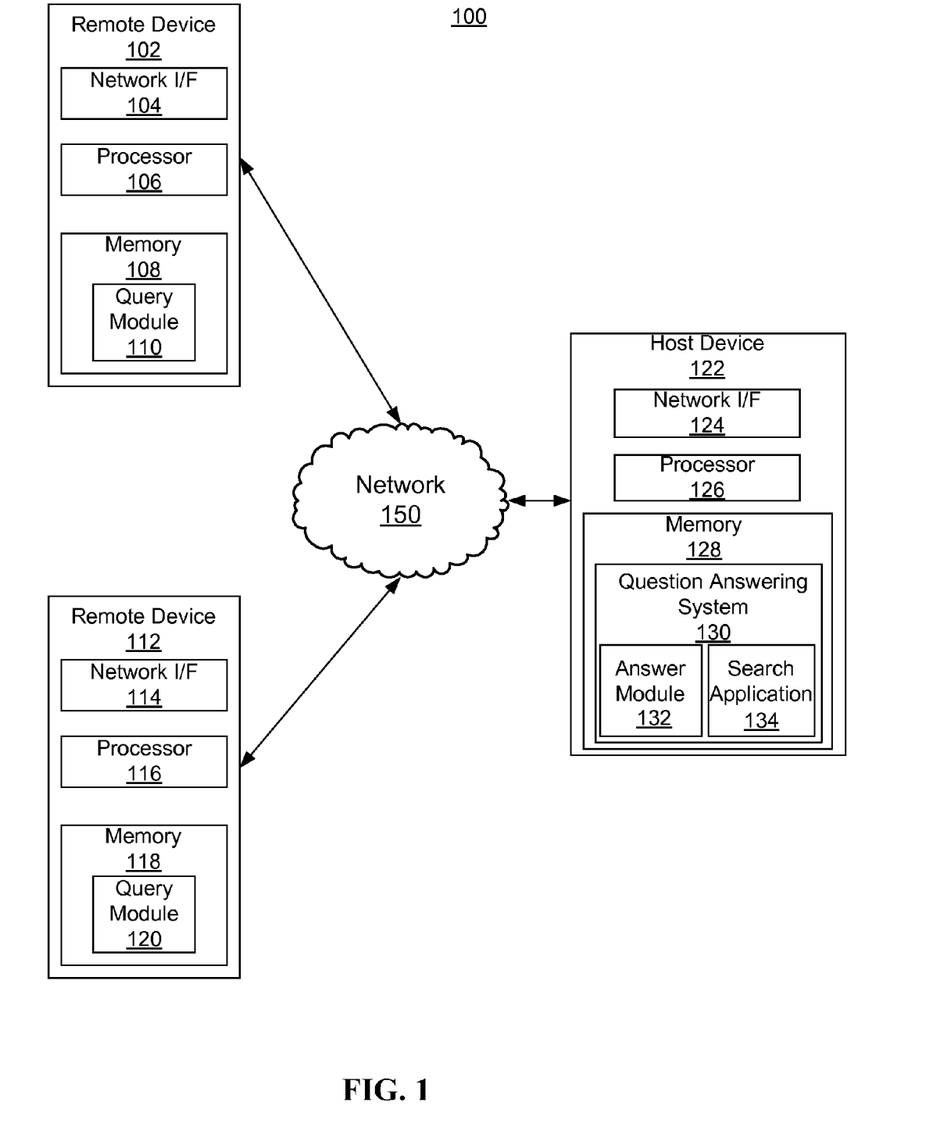
FIG. 1 is a diagrammatic illustration of an exemplary computing environment, consistent with embodiments of the present disclosure.

Turning now to the figures, FIG. 1 is a diagrammatic illustration of an exemplary computing environment, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 100 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In certain embodiments, the network 100 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a question answering system 130 (also referred to herein as a QA system) having a search application 134 and an answer module 132. In certain embodiments, the search application may be implemented by a conventional or other search engine, and may be distributed across multiple computer systems. The search application 134 can be configured to search one or more databases or other computer systems for content that is related to a question input by a user at a remote device 102, 112.

In certain embodiments, remote devices 102, 112 enable users to submit questions (e.g., search requests or other queries) to host devices 122 to retrieve search results. For example, the remote devices 102, 112 may include a query module 110 (e.g., in the form of a web browser or any other suitable software module) and present a graphical user (e.g., GUI, etc.) or other interface (e.g., command line prompts, menu screens, etc.) to solicit queries from users for submission to one or more host devices 122 and further to display answers/results obtained from the host devices 122 in relation to such queries.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the answer module 132 may include one or more modules or units to perform the various functions of present disclosure embodiments described below (e.g., formulating an answer to an input question, identifying a set of candidate images, determined images to provide, selecting a subset, etc.), and may be implemented by any combination of any quantity of software and/or hardware modules or units.

Figure 2:
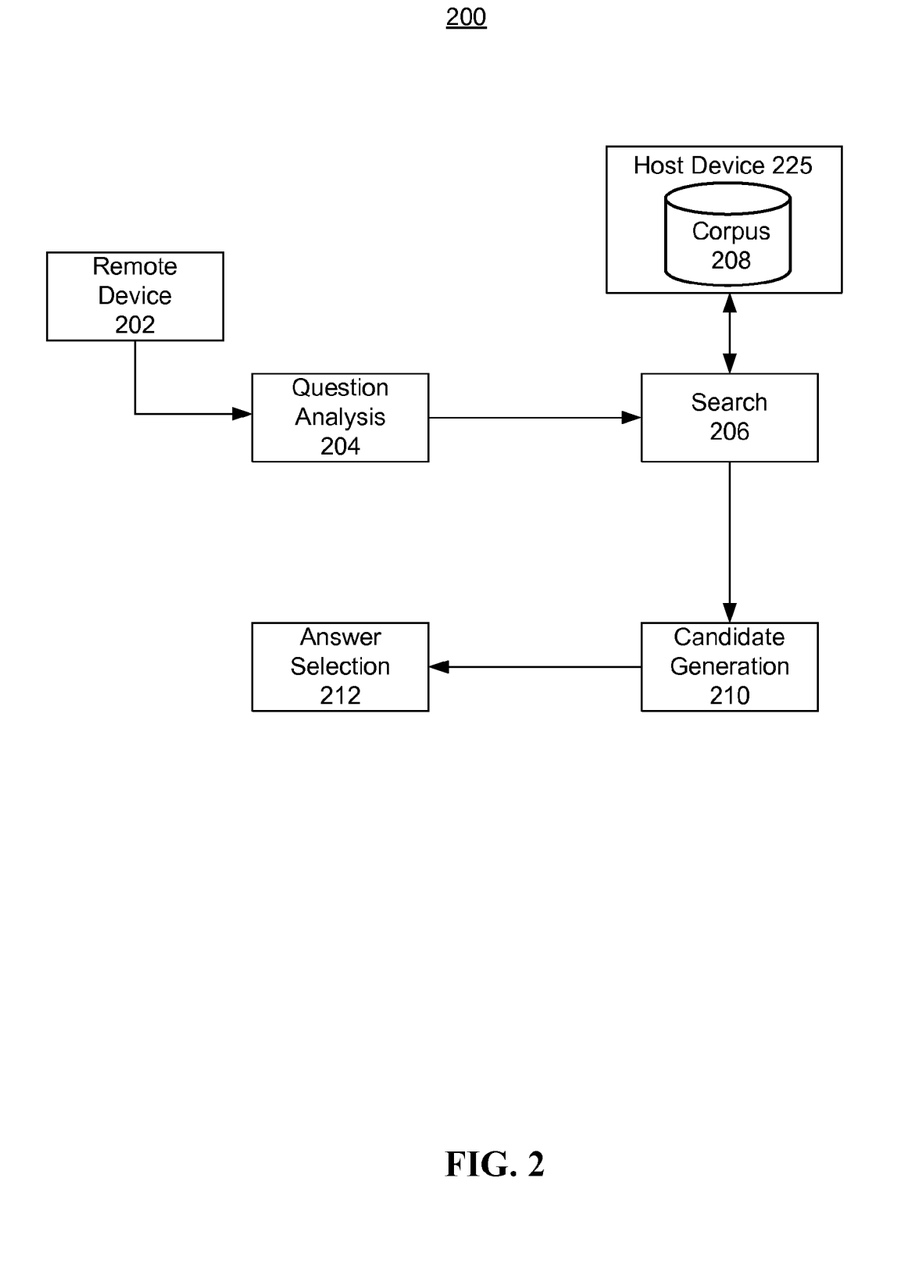
FIG. 2 is a system diagram depicting a high level logical architecture for a question answering system, consistent with embodiments of the present disclosure.

FIG. 2 is a system diagram depicting a high level logical architecture for a question answering system (also referred to herein as a QA system), consistent with embodiments of the present disclosure. Aspects of FIG. 2 are directed toward components for use with a QA system. In certain embodiments, the question analysis component 204 can receive a natural language question from a remote device 202, and can analyze the question to produce, minimally, the semantic type of the expected answer. The search component 206 can formulate queries from the output of the question analysis component 204 and may consult various resources such as the internet or one or more knowledge resources, e.g., databases, corpora 208, to retrieve documents, passages, web-pages, database tuples, etc., that are relevant to answering the question. For example, as shown in FIG. 2, in certain embodiments, the search component 206 can consult a corpus of information 208 on a host device 225. The candidate answer generation component 210 can then extract from the search results potential (candidate) answers to the question, which can then be scored and ranked by the answer selection component 212 which may produce a final ranked list of answers with associated confidence measure values.

The various components of the exemplary high level logical architecture for a QA system described above may be used to implement various aspects of the present disclosure. For example, the question analysis component 204 could, in certain embodiments, be used to process a natural language question for which relevant images can be provided. Further, the search component 206 can, in certain embodiments, be used to perform a search of a corpus of information 208 for a set of images that are related to an answer to an input question to the QA system. The candidate generation component 210 can be used to identify a set of candidate images based on the results of the search component 206. Further, the answer selection component 212 can, in certain embodiments, be used to determine and select a subset of the set of candidate images to provide in a display area. In certain embodiments, the determination of the subset of the candidate images can be based on a confidence value of the set of images and a designated display specification.

Figure 3:
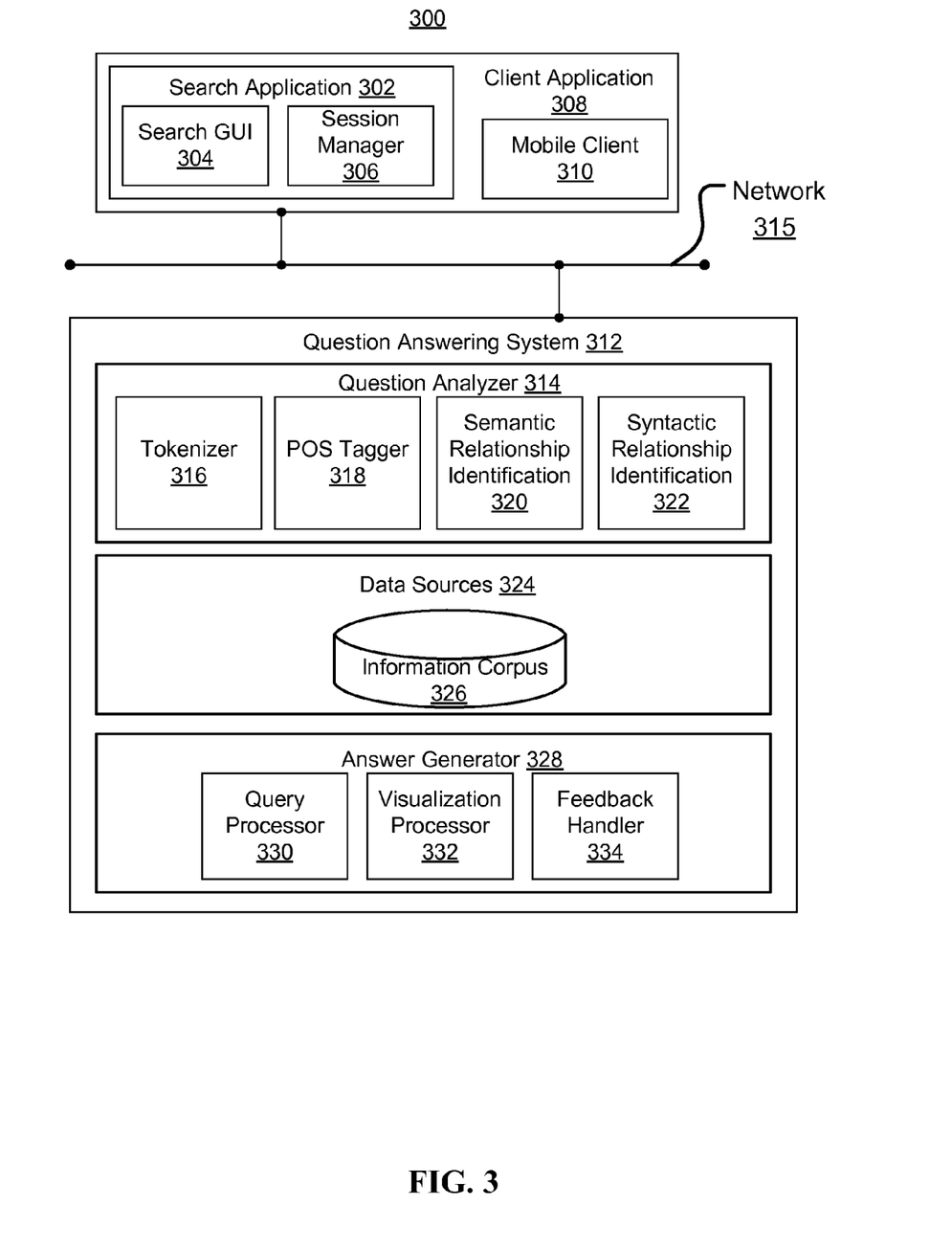
FIG. 3 is a block diagram illustrating a question answering system to generate answers to one or more input questions, consistent with various embodiments of the present disclosure.

FIG. 3 is a block diagram illustrating a question answering system (also referred to herein as a QA system) to generate answers to one or more input questions, consistent with various embodiments of the present disclosure. Aspects of FIG. 3 are directed toward an exemplary system architecture 300 of a question answering system 312 to generate answers to queries (e.g., input questions). In certain embodiments, one or more users may send requests for information to QA system 312 using a remote device (such as remote devices 102, 112 of FIG. 1). QA system 312 can perform methods and techniques for responding to the requests sent by one or more client applications 308. Client applications 308 may involve one or more entities operable to generate events dispatched to QA system 312 via network 315. In certain embodiments, the events received at QA system 312 may correspond to input questions received from users, where the input questions may be expressed in a free form and in natural language.

A question (similarly referred to herein as a query) may be one or more words that form a search term or request for data, information or knowledge. A question may be expressed in the form of one or more keywords. Questions may include various selection criteria and search terms. A question may be composed of complex linguistic features, not only keywords. However, keyword-based search for answer is also possible. In certain embodiments, using unrestricted syntax for questions posed by users is enabled. The use of restricted syntax results in a variety of alternative expressions for users to better state their needs.

Consistent with various embodiments, client applications 308 can include one or more components such as a search application 302 and a mobile client 310. Client applications 308 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 312. For example, mobile client 310 may be an application installed on a mobile or other handheld device. In certain embodiments, mobile client 310 may dispatch query requests to QA system 312.

Consistent with various embodiments, search application 302 can dispatch requests for information to QA system 312. In certain embodiments, search application 302 can be a client application to QA system 312. In certain embodiments, search application 302 can send requests for answers to QA system 312. Search application 302 may be installed on a personal computer, a server or other computer system. In certain embodiments, search application 302 can include a search graphical user interface (GUI) 304 and session manager 306. Users may enter questions in search GUI 304. In certain embodiments, search GUI 304 may be a search box or other GUI component, the content of which represents a question to be submitted to QA system 312. Users may authenticate to QA system 312 via session manager 306. In certain embodiments, session manager 306 keeps track of user activity across sessions of interaction with the QA system 312. Session manager 306 may keep track of what questions are submitted within the lifecycle of a session of a user. For example, session manager 306 may retain a succession of questions posed by a user during a session. In certain embodiments, answers produced by QA system 312 in response to questions posed throughout the course of a user session may also be retained. Information for sessions managed by session manager 306 may be shared between computer systems and devices.

In certain embodiments, client applications 308 and QA system 312 can be communicatively coupled through network 315, e.g. the Internet, intranet, or other public or private computer network. In certain embodiments, QA system 312 and client applications 308 may communicate by using Hypertext Transfer Protocol (HTTP) or Representational State Transfer (REST) calls. In certain embodiments, QA system 312 may reside on a server node. Client applications 308 may establish server-client communication with QA system 312 or vice versa. In certain embodiments, the network 315 can be implemented within a cloud computing environment, or using one or more cloud computing services. Consistent with various embodiments, a cloud computing environment can include a network-based, distributed data processing system that provides one or more cloud computing services.

Consistent with various embodiments, QA system 312 may respond to the requests for information sent by client applications 308, e.g., posed questions by users. QA system 312 can generate answers to the received questions. In certain embodiments, QA system 312 may include a question analyzer 314, data sources 324, and answer generator 328. Question analyzer 314 can be a computer module that analyzes the received questions. In certain embodiments, question analyzer 314 can perform various methods and techniques for analyzing the questions syntactically and semantically. In certain embodiments, question analyzer 314 can parse received questions. Question analyzer 314 may include various modules to perform analyses of received questions. For example, computer modules that question analyzer 314 may encompass include, but are not limited to a tokenizer 316, part-of-speech (POS) tagger 318, semantic relationship identification 320, and syntactic relationship identification 322.

Consistent with various embodiments, tokenizer 316 may be a computer module that performs lexical analysis. Tokenizer 316 can convert a sequence of characters into a sequence of tokens. Tokens may be string of characters typed by a user and categorized as a meaningful symbol. Further, in certain embodiments, tokenizer 316 can identify word boundaries in an input question and break the question or any text into its component parts such as words, multiword tokens, numbers, and punctuation marks. In certain embodiments, tokenizer 316 can receive a string of characters, identify the lexemes in the string, and categorize them into tokens.

Consistent with various embodiments, POS tagger 318 can be a computer module that marks up a word in a text to correspond to a particular part of speech. POS tagger 318 can read a question or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously posed questions. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In certain embodiments, POS tagger 316 can tag or otherwise annotates tokens of a question with part of speech categories. In certain embodiments, POS tagger 316 can tag tokens or words of a question to be parsed by QA system 312.

Consistent with various embodiments, semantic relationship identification 320 may be a computer module that can identify semantic relationships of recognized entities in questions posed by users. In certain embodiments, semantic relationship identification 320 may determine functional dependencies between entities, the dimension associated to a member, and other semantic relationships.

Consistent with various embodiments, syntactic relationship identification 322 may be a computer module that can identify syntactic relationships in a question composed of tokens posed by users to QA system 312. Syntactic relationship identification 322 can determine the grammatical structure of sentences, for example, which groups of words are associated as "phrases" and which word is the subject or object of a verb. In certain embodiments, syntactic relationship identification 322 can conform to a formal grammar.

In certain embodiments, question analyzer 314 may be a computer module that can parse a received query and generate a corresponding data structure of the query. For example, in response to receiving a question at QA system 312, question analyzer 314 can output the parsed question as a data structure. In certain embodiments, the parsed question may be represented in the form of a parse tree or other graph structure. To generate the parsed question, question analyzer 130 may trigger computer modules 132-144. Question analyzer 130 can use functionality provided by computer modules 316-322 individually or in combination. Additionally, in certain embodiments, question analyzer 130 may use external computer systems for dedicated tasks that are part of the question parsing process.

Consistent with various embodiments, the output of question analyzer 314 can be used by QA system 312 to perform a search of one or more data sources 324 to retrieve information to answer a question posed by a user. In certain embodiments, data sources 324 may include data warehouses, information corpora, data models, and document repositories. In certain embodiments, the data source 324 can be an information corpus 326. The information corpus 326 can enable data storage and retrieval. In certain embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In one embodiment, the information corpus may be a relational database. In some example embodiments, data sources 324 may include one or more document repositories.

In certain embodiments, answer generator 328 may be a computer module that generates answers to posed questions. Examples of answers generated by answer generator 328 may include, but are not limited to, answers in the form of natural language sentences; reports, charts, or other analytic representation; raw data; web pages, and the like.

Consistent with various embodiments, answer generator 328 may include query processor 330, visualization processor 332 and feedback handler 334. When information in a data source 324 matching a parsed question is located, a technical query associated with the pattern can be executed by query processor 330. Based on retrieved data by a technical query executed by query processor 330, visualization processor 332 can render visualization of the retrieved data, where the visualization represents the answer. In certain embodiments, visualization processor 332 may render various analytics to represent the answer including, but not limited to, images, charts, tables, dashboards, maps, and the like. In certain embodiments, visualization processor 332 can present the answer to the user in understandable form.

In certain embodiments, feedback handler 334 can be a computer module that processes feedback from users on answers generated by answer generator 328. In certain embodiments, users may be engaged in dialog with the QA system 312 to evaluate the relevance of received answers. Answer generator 328 may produce a list of answers corresponding to a question submitted by a user. The user may rank each answer according to its relevance to the question. In certain embodiments, the feedback of users on generated answers may be used for future question answering sessions.

The various components of the exemplary question answering system described above may be used to implement various aspects of the present disclosure. For example, the client application 308 could be used to receive a question from a user. The question analyzer 314 could, in certain embodiments, be used to process a natural language question for which relevant images can be provided. Further, the question answering system 312 could, in certain embodiments, be used to perform a search of an information corpus 326 for a set of images that are related to an answer to an input question to the question answering system. The answer generator 328 can be used to identify a set of candidate images based on the results of the search performed by the question answering system 312. Further, the visualization processor 332 can, in certain embodiments, be used to determine and select a subset of the set of candidate images to provide in a display area. In certain embodiments, the determination of the subset of the candidate images can be based on a confidence value of the set of images and a designated display specification.

Figure 4:
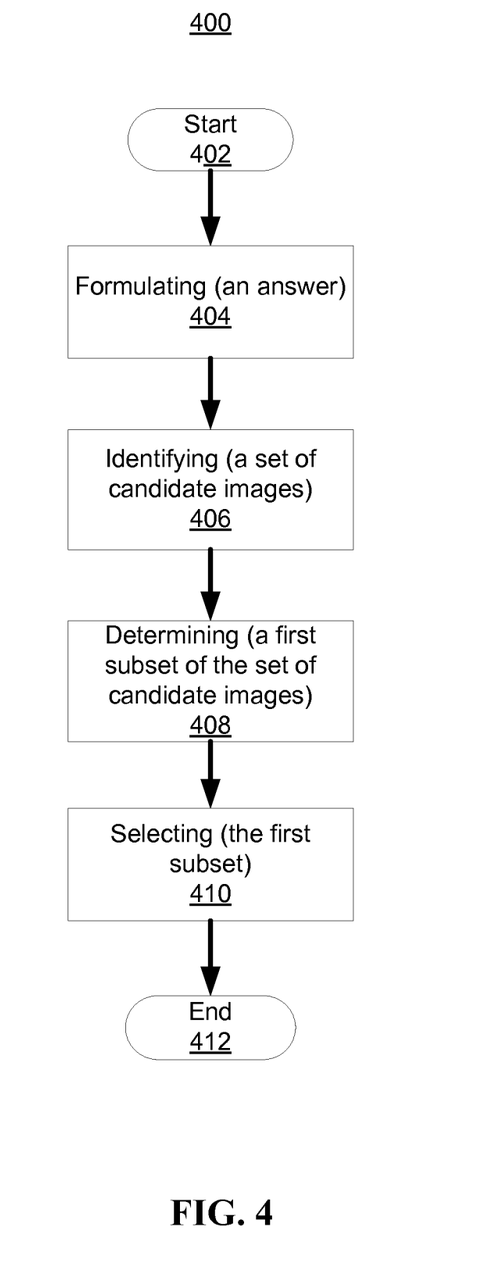
FIG. 4 is a flowchart illustrating a method for providing content relevant images for a question answering system, consistent with embodiments of the present disclosure.

FIG. 4 is a flowchart illustrating a method 400 for providing content relevant images for a question answering system, consistent with embodiments of the present disclosure. The method 400 may begin at block 402. Consistent with various embodiments, the method can include a formulating block 404, an identifying block 406, a determining block 408, and a selecting block 410. The method 400 may end at block 412.

Consistent with various embodiments, at block 404 the method 400 can include formulating an answer to an input question to the QA system. In certain embodiments, formulating an answer to an input question can include using a QA system such as the QA system of FIG. 3. For example, formulating the answer to a question can include receiving a question in a QA system from a mobile client. A question analyzer may parse the question, identify tokens, tag the parts of speech, and determine the semantic and syntactic relationships present in the question. The QA system may then consult a data source, such as an information corpus, to retrieve documents and information to answer the question. In certain embodiments, formulating the answer to a question can include using an answer generator to organize and render the information in the form of an answer to the question.

Consistent with various embodiments, at block 406 the method 400 can include identifying a set of candidate images relevant to the answer to the question. In certain embodiments, the set of candidate images can be located within a corpus of information containing documents and information accessible for search by the method 400. In certain embodiments, the answer to the input question can be formulated based on information in a first document, and the set of candidate images can be identified from one or more different documents. For example, for an input question of "What cable is needed to transmit video from my home theater PC to my TV?" the answer may be generated from a TV instruction manual, while images relevant to the answer (e.g., images showing the specific cable) may be identified from a technical blog, website, or retailer product specifications.

In certain embodiments, identifying the set of candidate images can include using a natural language processing technique. The natural language processing technique can be configured to recognize keywords, contextual information, and metadata tags associated with a set of images and the answer to the input question. In certain embodiments, the natural language processing technique can be configured to analyze summary information, keywords, figure captions, and text descriptions coupled with a set of images, and use syntactic and semantic elements present in this information to identify the set of candidate images. The syntactic and semantic elements can include information such as word frequency, word meanings, text font, italics, hyperlinks, proper names, noun phrases, and the context of surrounding words. Other syntactic and semantic elements are also possible.

As an example, in certain embodiments, an image may be referenced within a text description, or could be accessible via a hyperlink embedded in the text. The natural language processing technique can follow such references to locate the image. Additionally, in certain embodiments, the documents in the corpus of information can be pre-processed, and annotated to indicate references to instructions, concepts, and procedures that may be relevant to the process of identifying a set of candidate images.

Consistent with various embodiments, at block 408 the method 400 can include determining a first subset of the set of candidate images to provide in a display area. In certain embodiments, the display area can be a portion of an interface configured to provide images. As discussed in greater detail below, determining the first subset of the set of candidate images can be based on a confidence measure value (similarly referred to herein as a confidence value) of the set of images and a designated display specification. In certain embodiments, the confidence value of the set of candidate images can be based on similarity between contextual information associated with the set of candidate images and the answer to the input question. In certain embodiments, the designated display specification can include a first dimension of the set of candidate images and a second dimension of the display area. Put differently, the designated display specification can be based on the size (e.g., dimensions) of the set of candidate images and the size of the display area (e.g., portion of a screen configured to display an image). As discussed in greater detail below, in certain embodiments, the designated display specification can include assigning the set of candidate images a proportional value. In certain embodiments, the proportional value can be based on the size of the display area and the size of the set of candidate images. For example, the proportional value may be a percentage or fractional value that refers to what portion of the display area will be occupied by the set of candidate images. For instance, a certain image may be assigned a proportional value of 50%, indicating that, if provided, it will occupy 50% of the display area.

Consistent with various embodiments, the designated display specification can be based on a variety of factors associated with the set of the candidate images. For instance, it can be based on the size of the image, resolution of the image, degree of compression, and the like. In certain embodiments, an algorithm may be utilized to generate confidence measure values for the set of candidate images based on these and other factors.

In certain embodiments, the method 400 can include appending a reference indicating the first subset to a text description associated with the answer to the input question. For example, a reference such as "See FIG. 2" could be inserted in an appropriate place within the text description of an answer to a question. Additionally, in certain embodiments, the method 400 can include providing a control interface configured to display a second subset of the set of candidate images. In certain embodiments, the control interface could be, for example, a ribbon menu accessible by a user and configured to display additional images that were not included in the first subset. Such a control interface could be useful in situations where an additional set of images could not be displayed with the first subset (e.g., for space allocation reasons, image resolution, or the like). Accordingly, a user could select the ribbon menu and view additional images that may be relevant to the answer to the input question.

Consistent with various embodiments, at block 410 the method 400 can include selecting one or more subsets of the set of candidate images to provide in a display area. As described in greater detail below, selecting the one or more subsets can be based upon the proportional values and the confidence measure values of the one or more subsets. In certain embodiments, the subsets may include one or more images. In certain embodiments, a single subset of images can be selected to be provided in the display area. In certain embodiments, multiple subsets of images can be selected to be provided in the display area. Whether a single subset or multiple subsets are selected to be provided in the display area can be determined based upon the proportional value and the confidence measure value of the subsets.

Figure 5:
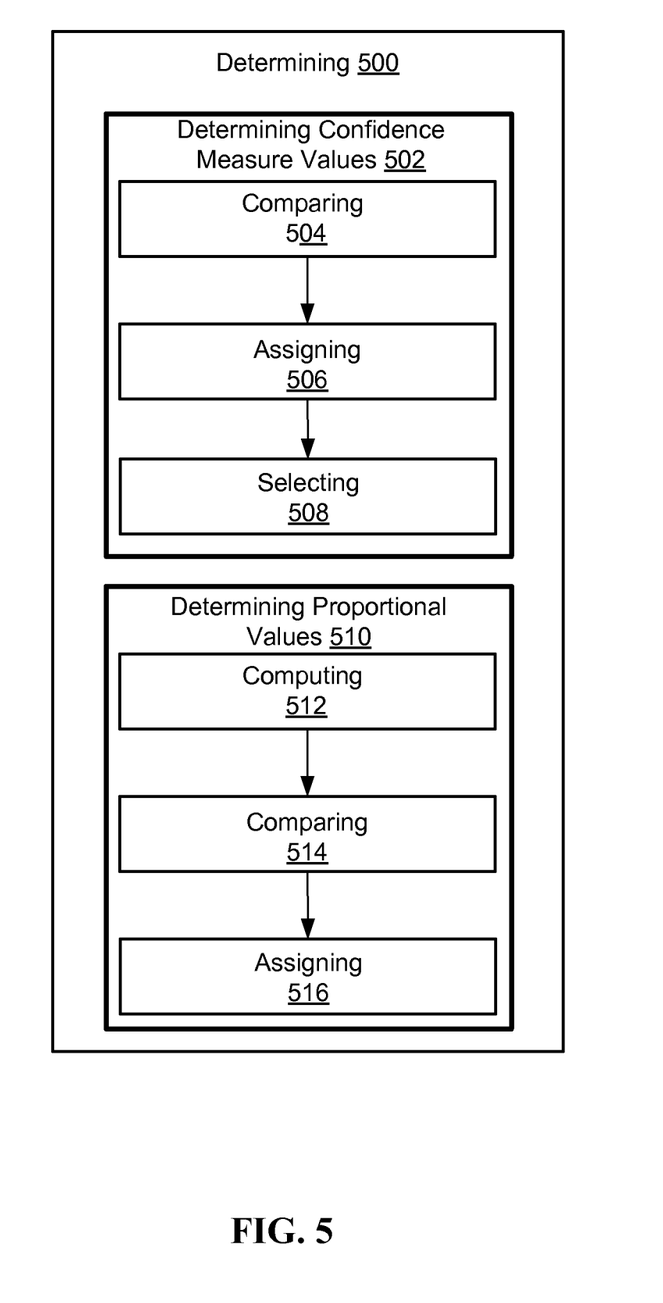
FIG. 5 is a flowchart illustrating an operation for determining a subset of images to provide in a display area, consistent with embodiments of the present disclosure.

FIG. 5 is a flowchart illustrating an operation 500 for determining a subset of images to provide in a display area, consistent with embodiments of the present disclosure. In certain embodiments, aspects of operation 500 can be used to implement block 408 of method 400. Consistent with various embodiments, operation 500 can include determining confidence measure values 502. The confidence measure values can be based on similarity between contextual information associated with the set of candidate images and the answer to the input question. Further, operation 500 can include determining proportional values 510. In certain embodiments, the proportional value can be based on the size of the display area and the size of the set of candidate images.

As shown in FIG. 5, at block 504 operation 500 can include comparing textual information coupled to the set of candidate images with the answer to an input question. In certain embodiments, a natural language processing technique can be used to assess the similarity between the textual information affiliated with the set of candidate images and the answer to the input question. In certain embodiments, the natural language processing technique can be configured to analyze summary information, keywords, figure captions, and text descriptions coupled with the set of candidate images, and use syntactic and semantic elements present in this information to identify the set of candidate images. The syntactic and semantic elements can include information such as word frequency, word meanings, text font, italics, hyperlinks, proper names, noun phrases, and the context of surrounding words.

In certain embodiments, at block 506, operation 500 can include assigning a confidence measure value to the set of candidate images based on the results of comparing 504. The confidence measure value can be a numerical value indicating similarity and relevance between the set of candidate images and the answer to the input question. For example, a first subset of the set of candidate images may be assigned a greater number to indicate greater relevance between the first subset and the answer to the input question, and second subset may be assigned a lower number to indicate lesser relevance between the second subset and the answer to the input question. At block 508, operation 500 can include selecting a first subset of the set of candidate images to provide in a display area. In certain embodiments, the first subset may be selected in response to having a confidence measure value greater than a confidence threshold value. Such a configuration can provide benefits associated with providing a user one or more images highly relevant to his or her input question.

As shown in FIG. 5, at block 512 operation 500 can include computing a first dimension of the set of candidate images and a second dimension of the display area. In certain embodiments, multiple dimensions can be computed for the set of candidate images and the display area. For example, in certain embodiments, the length and height of the set of candidate images and the display area can be computed. At block 514, operation 500 can include comparing the first dimension of the set of candidate images with the second dimension of the display area. Based on comparing the first dimension of the set of candidate images with the second dimension of the display area, at block 516 the method can include assigning a proportional value to a subset of the candidate images. The proportional value can, for example, be a numerical value such as a percentage, a decimal, or a fraction that indicates the portion of the display area that will be occupied by the set of candidate images. For instance, a certain image may be assigned a proportional value of 50%, indicating that, if provided, it will occupy 50% of the display area. As another example, an image may be assigned a proportional value of 0.75, indicating that, if provided, it will occupy three-fourths of the display area.

Figure 6:
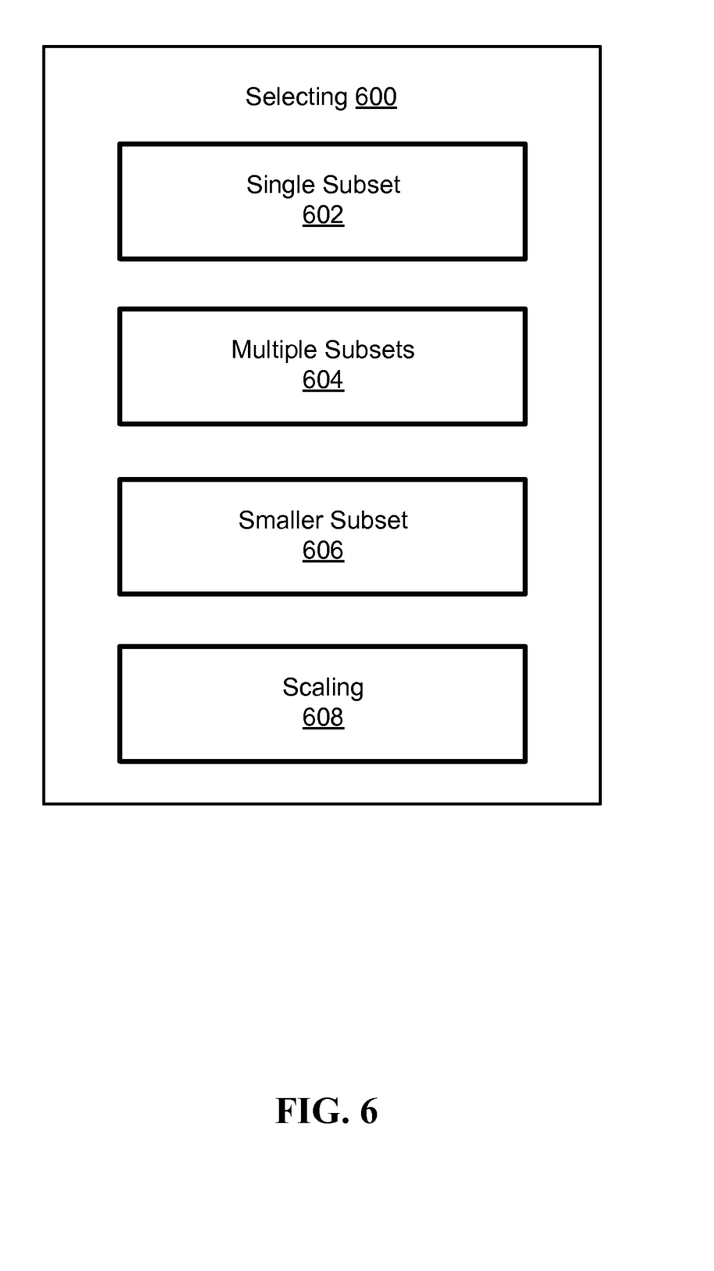
FIG. 6 is a flowchart illustrating an operation for selecting a subset of images to provide in a display area, consistent with embodiments of the present disclosure.

FIG. 6 is a flowchart illustrating an operation 600 for selecting a subset of images to provide in a display area, consistent with embodiments of the present disclosure. In certain embodiments, aspects of operation 600 can be used to implement block 410 of method 400. In certain embodiments, selecting the one or more subsets can be based upon the proportional values and the confidence measure values of the one or more subsets.

As shown in FIG. 6, in certain embodiments, at block 602 the operation 600 can be configured to select a single subset of the set of candidate images to provide in the display area. As an example, in certain embodiments, a first subset of the set of candidate images may be selected in response to the first subset having a proportional value greater than or equal to a first proportional threshold value. The first proportional threshold value can, for example, be a minimum size limit for a subset of images. For instance, the first proportional threshold value may be 85%, indicating that a subset having a proportional value greater than or equal to 85% (e.g., a subset that would occupy 85% or more of the display area) is requested. Accordingly, such a configuration can provide benefits associated with providing a single, large subset in the display area.

Consistent with various embodiments, at block 604 the operation 600 can be configured to select multiple subsets of the set of candidate images to provide in the display area. As an example, in certain embodiments, in response to a second subset having a proportional threshold value less than a second proportional threshold value, the operation 600 can include selecting both the second subset and a third subset of the candidate images. For instance, the second proportional threshold value may be 60%, and the proportional value of the second subset may be 40%. In such a situation, the operation 600 could select the second subset as well as a third subset. The third subset may also have a proportional value lower than the second proportional value threshold. For example, the third subset may have a proportional value of 30%. Accordingly, the operation 600 could select both the second subset as well as the third subset to provide in the display area. Such a configuration can provide benefits associated with providing multiple relevant subsets in the display area.

In certain embodiments, at block 606, the operation 600 can be configured to select a smaller subset (e.g., a subset having a proportional value less than one or more other subsets of the set of candidate images) of the set of candidate images to provide in the display area. As an example, in certain embodiments, in response to a fourth subset having a proportional value greater than or equal to a third proportional threshold value, the operation 600 can include selecting a fifth subset of the candidate images having a proportional value lower than the third subset. For instance, in certain embodiments, the third proportional threshold value may be 70%, and the fourth subset may have a proportional value of 80%. Accordingly, the operation 600 can select a fifth subset having a proportional value less than that of the fourth subset, such at 75%. Such a configuration can be useful in situations where, for example, the fifth subset has a confidence value higher than that of the fourth subset. Additionally, such a configuration can have further benefits for providing a subset that is appropriate for the dimensions of the display area.

As shown in FIG. 6, in certain embodiments, at block 608 the operation 600 can be configured to scale a subset of the set of candidate images to provide in the display area. Scaling can include shrinking or enlarging the subset based on the dimensions of the display area. For example, in certain embodiments, in response to a sixth subset having a confidence measure value greater than a second confidence measure threshold value, and a proportional value greater than a fourth proportional threshold value, the operation 600 can include resizing the image. Such a configuration can be particularly useful for situations where a particular subset has a high confidence value, but is too large to fit in the display area. For example, the second confidence measure threshold value may be 80, and the fourth proportional threshold value may be 90%. A sixth subset having a confidence measure value of 90, and a proportional value of 95% may be resized, decreasing the proportional value and allowing the sixth subset to be provided in the display area. Such a configuration can be useful for providing a subset having a high confidence value in situations where the subset is originally too large to fit in the display area.

Figure 7:
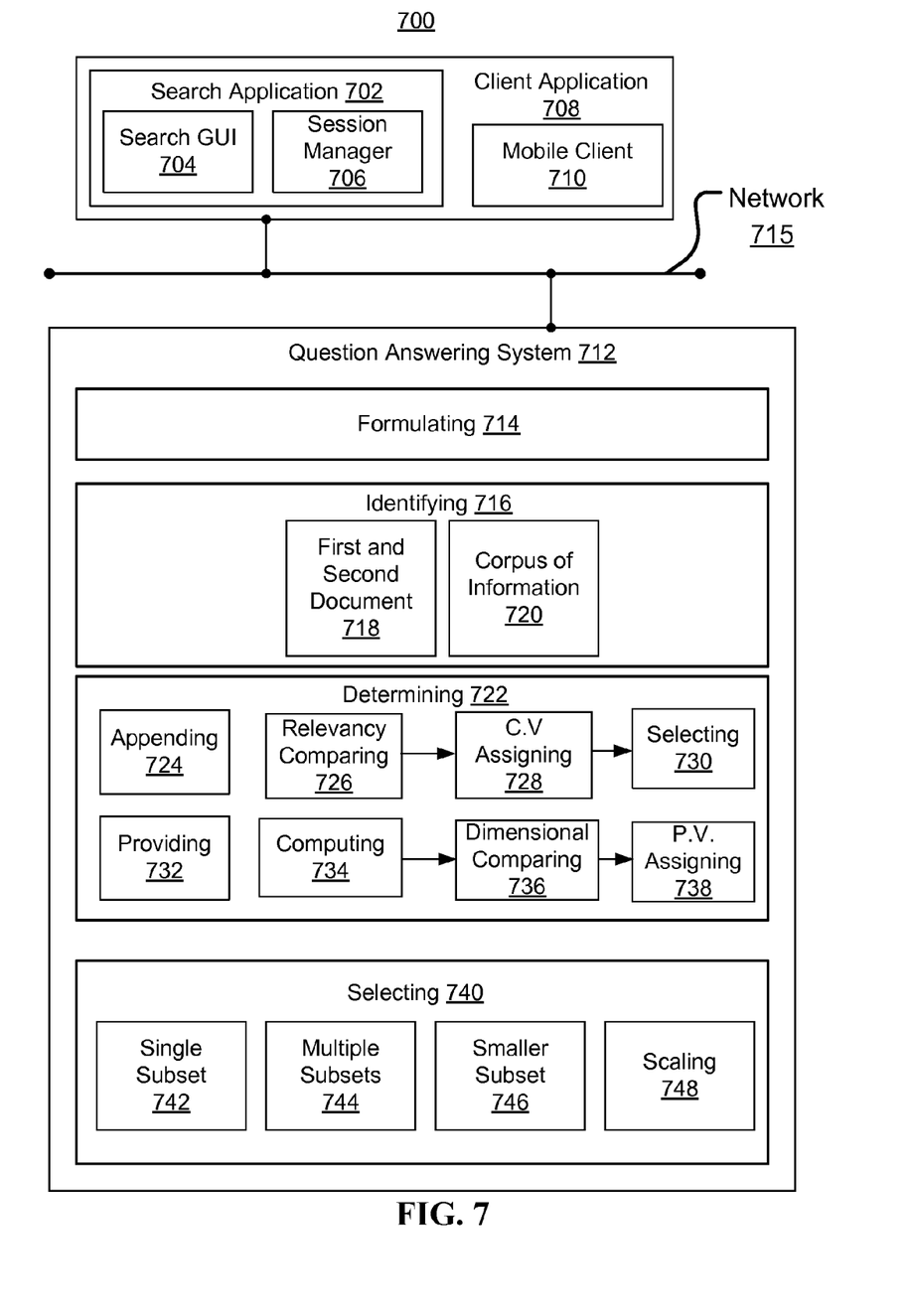
FIG. 7 is a block diagram illustrating modules of a system for providing content relevant images for an input question to a question answering system, consistent with embodiments of the present disclosure.

FIG. 7 illustrates modules of a system for providing content relevant images for an input question to a question answering system 712, consistent with embodiments of the present disclosure. Consistent with various embodiments, method 400 can be implemented using one or more modules of FIG. 7. These modules can be implemented in hardware, software, or firmware executable on hardware, or a combination thereof. For example, these modules may be implemented on an exemplary computer system 700.

In certain embodiments, one or more users may send requests for information to QA system 712 using a remote device (such as remote devices 102, 112 of FIG. 1). QA system 712 can perform methods and techniques for responding to the requests sent by one or more client applications 708. Client applications 708 may involve one or more entities operable to generate events dispatched to QA system 712 via network 715. In certain embodiments, the events received at QA system 712 may correspond to input questions received from users, where the input questions may be expressed in a free form and in natural language.

Consistent with various embodiments, client applications 708 can include one or more components such as a search application 702 and a mobile client 710. Client applications 708 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 712. For example, mobile client 710 may be an application installed on a mobile or other handheld device. In certain embodiments, mobile client 710 may dispatch query requests to QA system 712.

Consistent with various embodiments, search application 702 can dispatch requests for information to QA system 712. In certain embodiments, search application 702 can be a client application to QA system 712. In certain embodiments, search application 702 can send requests for answers to QA system 712. Search application 712 may be installed on a personal computer, a server or other computer system. In certain embodiments, search application 702 can include a search graphical user interface (GUI) 704 and session manager 706. Users may enter questions in search GUI 704. In certain embodiments, search GUI 704 may be a search box or other GUI component, the content of which represents a question to be submitted to QA system 712. Users may authenticate to QA system 712 via session manager 706. In certain embodiments, session manager 706 keeps track of user activity across sessions of interaction with the QA system 712. Session manager 706 may keep track of what questions are submitted within the lifecycle of a session of a user. For example, session manager 706 may retain a succession of questions posed by a user during a session. In certain embodiments, answers produced by QA system 712 in response to questions posed throughout the course of a user session may also be retained. Information for sessions managed by session manager 706 may be shared between computer systems and devices.

Question answering system 712 can include a formulating module 714. The formulating module 714 can be configured to formulate an answer to an input question received by the question answering system 712.

The question answering system 712 can include an identifying module 716 configured to identify a set of candidate images. Identifying the candidate images can be based on the answer to the input question, and the set of candidate images can relate to the answer. The set of candidate images may be located within a corpus of information. The question answering system 712 can include a corpus of information module 720 configured to access a corpus of information. The corpus of information can contain documents and images accessible for search. The answer to the input question can be formulated based on information from a first document, and the set of candidate images can be identified from a second document. Accordingly, the question answering system 712 can include a first and second document module 718 configured to perform a search of the corpus of information containing the first document and the second document.

The question answering system 712 can include a determining module 722 configured to determine a first subset of the set of candidate images to provide in a display area. Determining the first subset of the set of candidate images can be based on a confidence value of the set of candidate images and a designated display specification. The confidence value of the set of candidate images may be based on a similarity of content between the answer to the input question and the set of candidate images. The determining module 722 can include a relevancy comparing module 726 configured to compare, using a natural language processing technique, textual information coupled to the set of candidate images with the answer to the input question. Based on comparing, the confidence value (C.V.) assigning module 728 can be configured to assign a confidence measure value to the set of candidate images. Further, the selecting module 730 can be configured to select, in response to a first subset having a confidence measure value greater than a threshold value, the first subset to provide in the image display area. Additionally, the method can include a providing module 732 configured to provide a control interface to display an additional subset of the set of candidate images. The method can also include an appending module 724 configured to append a reference indicating the first subset to a text description associated with the answer to the input question.

The designated display specification of the candidate images and the display area may include a first dimension of the set of candidate images and a second dimension of the display area. The determining module 722 can include a computing module 734 configured to compute the first dimension of the set of candidate images and the second dimension of the display area. The dimensional comparing module 736 can be configured to compare the first dimension of the set of candidate images with the second dimension of the display area. Based on comparing, the proportional value (P.V.) assigning module 738 can be configured to assign a proportional value to a subset of the candidate images.

The question answering system 712 can include a selecting module 740. The selecting module 740 can include a single subset module 742 configured to select, in response to a third subset having a confidence measure value greater than a first threshold value, the third subset to display in the image display area. The multiple subsets module 742 can be configured to select a third subset and a fourth subset to display in the image display area in response to the third subset having a proportional value greater than or equal to a first proportional threshold value. Further, the smaller subset module 746 can be configured to select, in response to the third subset having a proportional value greater than or equal to a third proportional threshold value, a fifth subset of the candidate of the candidate images having a proportional value lower than the third subset. Additionally, the scaling module 748 can be configured to scale the first dimension of the third subset in response to the third subset having a confidence measure value higher than a second confidence measure threshold value and a proportional value greater than a second proportional threshold value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method in a question answering system for providing content relevant images for an input question, the method comprising:

formulating, in response to receiving the input question, an answer to the input question;

identifying, based on the answer to the input question, a set of candidate images from a corpus of information, the set of candidate images relating to the answer, wherein the corpus of information includes more than one document;

determining a respective confidence value for each image in the set of candidate images, wherein each respective confidence value is a numerical value indicating similarity and relevance between the respective candidate image and the answer to the input question;

assigning a respective proportional value to each candidate image of the set of candidate images, wherein each respective proportional value is a numerical value indicating a size of the respective image with respect to a size of a display area used to display the answer to the input question;

selecting a first subset of the set of candidate images to provide in the display area based on both the respective confidence values and the respective proportional values of the images in the set of candidate images, the first subset comprising one or more images of the set of candidate images; and displaying the first subset in the display area together with the answer to the input question.

2. The method of claim 1, wherein the answer to the input question is formulated based on information from a first document and the set of candidate images is identified from a second document.

3. The method of claim 2, wherein identifying the set of candidate images further comprises performing a search of the corpus of information containing at least the first document and the second document.

4. The method of claim 1, wherein determining a respective confidence value for each candidate image further comprises:

comparing, using a natural language processing technique, textual information coupled with each respective candidate image to the answer to the input question;

assigning, based on comparing textual information coupled to each respective candidate image with the answer to the input question, the respective confidence value to each candidate image.

5. The method of claim 1, wherein each respective proportional value is based on a first dimension of the respective candidate image and a second dimension of the display area.

6. The method of claim 5, wherein assigning a respective proportional value to each candidate image further comprises:
- computing the first dimension of each respective candidate image and the second dimension of the display area;
- comparing the first dimension of each respective candidate image with the second dimension of the display area; and
- assigning, based on comparing the first dimension with the second dimension, a proportional value to each respective candidate image.

7. The method of claim 6, wherein selecting the first subset comprises selecting the first subset in response to the first subset having a proportional value greater than or equal to a first proportional threshold value and in response to the first subset having a confidence value greater than a confidence threshold value.

8. The method of claim 6, further comprising selecting a second subset in addition to the first subset in response to the first subset having a proportional value less than a first proportional threshold value.

9. The method of claim 6, further comprising selecting a second subset in addition to the first subset in response to the first subset having a proportional value greater than or equal to a proportional threshold value, the second subset of the candidate images having a proportional value less than the first subset.

10. The method of claim 6, further comprising:
- scaling, in response to the first subset having a confidence value higher than a confidence measure threshold value and a proportional value greater than a proportional threshold value, the first dimension of the first subset.

11. The method of claim 1, further comprising modifying text of the answer to the input question to include a reference indicating the first subset.

12. The method of claim 1, further comprising providing a control interface configured to display a second subset of the set of candidate images.

* * * * *